Oct. 22, 1963  H. STEORTS, JR  3,107,777
CONVEYOR CHAIN
Filed Feb. 16, 1959
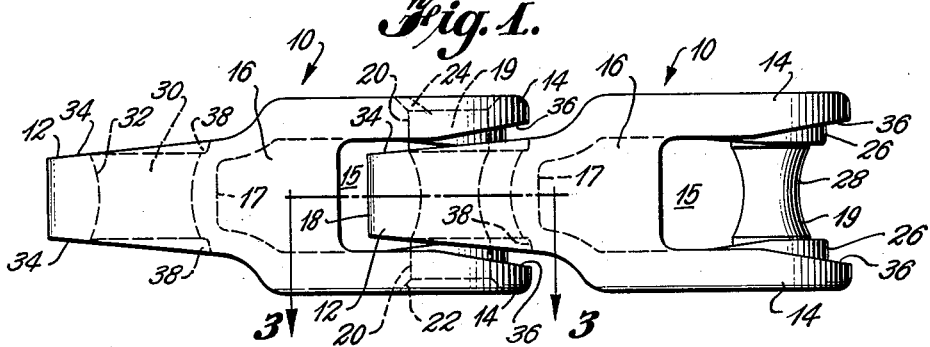
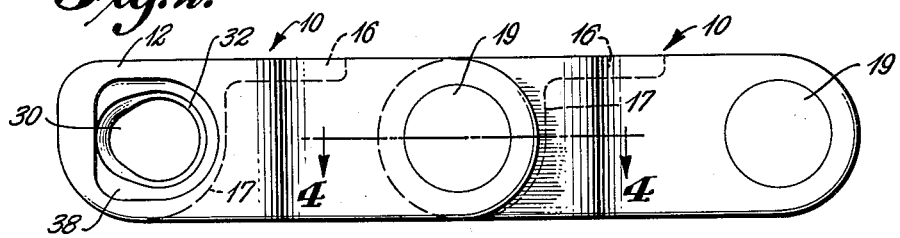
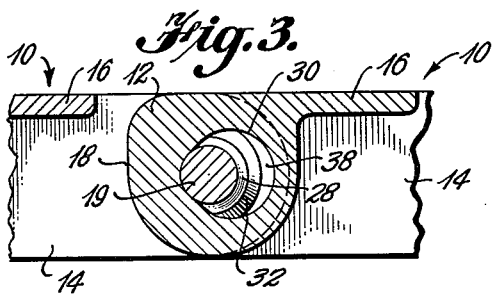
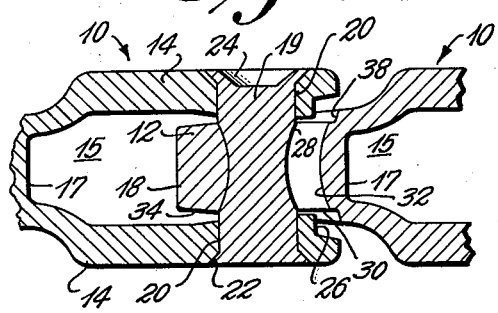
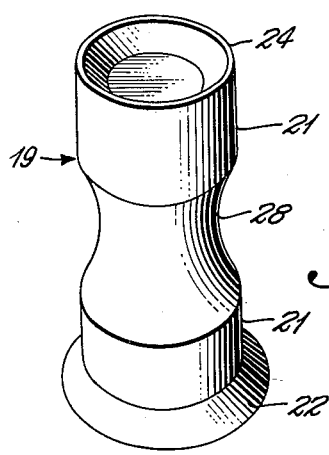

3,107,777
CONVEYOR CHAIN
Hubert Steorts, Jr., Indianapolis, Ind., assignor to Link-Belt Company, a corporation of Illinois
Filed Feb. 16, 1959, Ser. No. 793,447
3 Claims. (Cl. 198—189)

This invention relates to new and useful improvements in a conveyor chain adapted to bend in two planes and to travel in opposite directions.

The primary object of this invention is to provide a pintle chain of the above mentioned type which is formed of one-piece cast links each having a narrow barrel end and integral offset side bars with the links interconnected by pins, said chain having a greater allowable working load than prior chains of the same type and external dimensions which is due to the increased bearing area between the mating curved surfaces of the pin aperture, that is formed in the barrel end, and the cooperating portion of the pin, and to the higher allowable bearing pressure resulting from the pins being smooth, machine finished, hardened steel.

A more specific object of the invention is to provide a two-plane, reversible chain of the above-mentioned type in which the necessary universal joint action is produced by providing the pin aperture of the barrel end of each link with a convexed surface which is continuous throughout its entire periphery, and by providing the cooperating portion of each pin with a concaved surface which is continuous and symmetrical throughout its entire periphery.

Still further objects of the invention are to oppositely taper the outside surfaces of the barrel end and the inside surfaces of the two side bars to permit lateral bending at the joints; to provide the inside tapered surfaces of the two side bars with laterally projecting bosses through which the pin apertures extend for the purpose of providing adequate cross-sectional area to strengthen these portions of the side bars and to provide increased bearing areas for the pins; and to provide the tapered outside surfaces of the barrel end with recesses to receive the said bosses on the side bars of the next adjacent link to provide mating side bearing areas when lateral bending of the chain occurs.

Other objects and advantages of the invention will be apparent during the course of the following description.

In the accompanying drawing forming a part of this specification and in which like numerals are employed to designate like parts throughout the same.

FIGURE 1 is a top plan view of a section of chain comprising two links embodying the present invention, FIGURE 2 is a side elevational view of the chain shown in FIG. 1, FIGURE 3 is a fragmentary sectional view taken on the line 3—3 of FIG. 1, FIGURE 4 is a fragmentary sectional view taken on the line 4—4 of FIG. 2, and FIGURE 5 is an enlarged perspective view of a chain pin employed in the invention and shown prior to its assembly with the chain link.

In the drawings, wherein for the purpose of illustration is shown the preferred embodiment of this invention, and first particularly referring to FIGS. 1 and 2, there is shown a section of pintle chain consisting of two links 10, each formed of a single casting, adapted for use as a conveyor in applications requiring the chain to bend around both horizontal and vertical curved paths. The chain, for example, may be used as a dairy milk case conveyor wherein the active run of the chain is guided along a horizontal path having one or more curved portions around which the chain is bent by means of either sprocket wheels or curved guide rails. At the opposite ends of the horizontal path, the chain is bent around sprocket wheels mounted for rotation about horizontal axes to provide the return run of the conveyor. It is frequently a requirement that conveyors of this type be reversible in their direction of travel so the drive sprocket wheel must be capable of engaging the links to propel the chain in opposite directions.

As viewed in FIGS. 1 and 2, each of the links 10 includes a narrow barrel 12 at one end thereof, and two integral, offset side bars 14 at the other end. Where the narrow barrel 12 joins the side bars 14, there is provided an integral web 16 which is located with its top surface level with the top surface of the barrel and the remaining top surfaces of the side bars 14 to provide an article conveying surface on each link. This web also covers a substantial portion of the space 15 which receives a sprocket tooth, not shown, which is meshing with the chain. When the chain is being driven to the left, as viewed in FIGS. 1 to 4, the sprocket teeth will engage the inner surfaces 17 of the barrels 12. The outer surfaces 18 of the barrels will be engaged by the sprocket teeth when the chain is being driven in the opposite direction.

As seen best in FIGS. 1, 4 and 5, each of the links 10, also includes a chain pin 19 supported by and passing through apertures 20 formed in the side bars 14. By also passing through apertures, to be later described, formed in the barrels 12, adjacent links will be interconnected. Preferably, the chain pin 19 has a cylindrical portion 21 at each end which is adapted to fit in the apertures 20 provided in the side bars 14. To secure the chain pin 19 against rotation and axial movement in the apertures 20, the pin is provided at one end with a conical head 22 adapted, as seen best in FIG. 4, to be received in the countersunk outer edge of one of the apertures 20 of one side bar 14. Before its assembly with a link, the other end of the pin is provided with an axially extending hole 24, the wall of which may be deformed, or riveted, outwardly, as shown in FIG. 4, to occupy the countersunk end portion of the aperture 20 in the side bar 14. The construction of one end of each pin 19 permits any desired number of the latter to be driven out of the pin apertures to disconnect links from the chain. Surrounding a portion of the inner end of each aperture 20, each side bar 14 is provided with an integral boss 26 which serves to strengthen the side bars and to provide a greater bearing area between the link and the chain pin 19 mounted thereon.

In accordance with the invention, the intermediate portion of each chain pin is provided with a longitudinally concaved bearing surface 28 which extends entirely around the pin periphery and is a symmetrical surface of revolution about the pin axis. Due to the fact that the pins have a symmetrical double curved surface, they may be economically machined smooth from steel stock and hardened for increased strength and greater resistance to wear.

To complete the universal joint action that is required to enable the chain to bend around curved portions of its path that are arranged in both vertical and horizontal planes, the apertures 30 formed in the narrow barrel ends of the links are each provided with a transversely convexed bearing surface 32 which extends around the entire periphery of the aperture. These bearing surfaces cooperate with the concaved bearing surfaces 28 of the chain pins 19 to permit the desired two plane bending movements at all of the joints. As shown in FIGS. 3 and 4, the forward portion of the convexed bearing surface 32 of the aperture, formed in the barrel 12, which engages the pin 19 during normal operation of the chain, is shaped and dimensioned to correspond with the concaved peripheral surface 28 of the pin so that the pin and barrel of two interconnected links coengage over a relatively large bearing area that is maintained despite bending of the chain in either or both of its two planes of movement. From FIG. 3, for example, it will be noted that the forward portion of the convexed aperture surface 32, with respect to an axis parallel to the pin and aperture, is arcuate and has a radius of curvature equal to the radius of the pin; while from FIG. 4 it will be noted that the convexed curvature of the aperture surface 32 is arcuate and similar to the concave curvature of the pin surface 28 in a direction along the length of the pin. Both of the bearing surfaces 28 and 32 are therefore similarly curved in both of the planes in which the chain bends and mate over a substantial bearing area when the chain is driven in its normal direction. Because both the concave bearing surfaces 28 of the pins and the convex bearing surfaces 32 of the barrel apertures are continuous, the chain may be driven in opposite directions.

It will be noted in FIGS. 1 and 4 that the outer side surfaces 34 of the barrel end of each link are tapered to cooperate with the tapered surfaces 36 on the insides of the side bars 14. These tapered surfaces allow for the bending of the chain around curves arranged in horizontal planes. To accommodate the bosses 26 that are integral with the inner surfaces of the side bars 14, the tapered surfaces 34 of the barrel ends of the links are formed with recesses 38.

It is to be understood that the form of this invention herewith shown and described is to be taken as a preferred example of the same and that various changes in the shape, size, and arrangement of parts may be resorted to without departing from the spirit of the invention or the scope of the subjoined claims.

Having thus described the invention, I claim:

1. A conveyor chain, comprising a series of interconnected links, each link having a barrel at one end portion and two offset side bars integral with the barrel, said side bars having aligned apertures formed in their outer end portions and said barrel having an aperture formed therein, and a pin passing through the apertures of the offset side bars and barrel of each two adjacent links to interconnect the latter and being secured to the side bars against axial and angular movements relative thereto, each pin having a longitudinally concaved peripheral surface of revolution positioned between the side bars with which it is associated and extending entirely around its periphery to provide a concave bearing area, and the aperture in each barrel having a transversely convexed peripheral surface in the forward portion thereof to provide a convex bearing area to matingly engage with said concave bearing area, said concave and convex bearing areas corresponding in curvature and being substantially coextensive to permit upon engagement of said areas the two connected links to bend relative to each other in two planes and to provide a substantial bearing area therebetween.

2. A conveyor chain as defined in claim 1 further characterized by the outside surfaces of the barrel end portion and the inside surfaces of the two side bars being tapered in opposite directions to allow for greater lateral bending of the two two connected links.

3. A conveyor chain as defined in claim 2 further characterized by the inside tapered surfaces of the two side bars each having a laterally projecting boss through which the pin aperture extends, and the outside tapered surfaces of the barrel end portion each having a recess to receive the opposed boss.

References Cited in the file of this patent

UNITED STATES PATENTS

| | | |
|---|---|---|
| 1,512,609 | Koelkebeck | Oct. 21, 1924 |
| 1,804,701 | Mojonnier | May 12, 1931 |
| 1,841,592 | Edwards | Jan. 19, 1932 |
| 1,956,298 | Paulson | Apr. 24, 1934 |
| 1,965,285 | Gilstad | July 3, 1934 |
| 1,996,586 | Meyer | Apr. 2, 1935 |
| 2,009,157 | Zilles et al. | July 23, 1935 |